United States Patent [19]

Traut

[11] 4,053,191

[45] Oct. 11, 1977

[54] ROLLING CONTACT SPRING BEARINGS

[76] Inventor: Earl W. Traut, 8040 Palm Lake Drive, Orlando, Fla. 32811

[21] Appl. No.: 628,350

[22] Filed: Nov. 3, 1975

[51] Int. Cl.² .................. F16C 19/20; F16C 19/40; F16C 19/56

[52] U.S. Cl. ............................................... 308/206

[58] Field of Search ............... 308/177, 199, 200, 206, 308/183, 184

[56] References Cited

U.S. PATENT DOCUMENTS

| 1,020,523 | 3/1912 | Taylor | 308/206 |
|---|---|---|---|
| 2,854,299 | 9/1958 | Drutowski | 308/200 |
| 3,124,396 | 3/1964 | Barager | 308/200 |
| 3,751,125 | 8/1973 | Howland et al. | 308/206 |

*Primary Examiner*—Richard A. Bertsch

[57] ABSTRACT

Radial load rolling-contact-only bearings wherein rotating rings act as springs and additionally assure continuous separation between all rotating elements, thereby carrying the entire bearing load and permitting radial deflection under load. In other embodiments radial deflection is minimal, most of the bearing load being carried by rollers, the spring-rings serving primarily to maintain separation therebetween. Cumulative-tolerance slippage is avoided or minimal.

9 Claims, 16 Drawing Figures

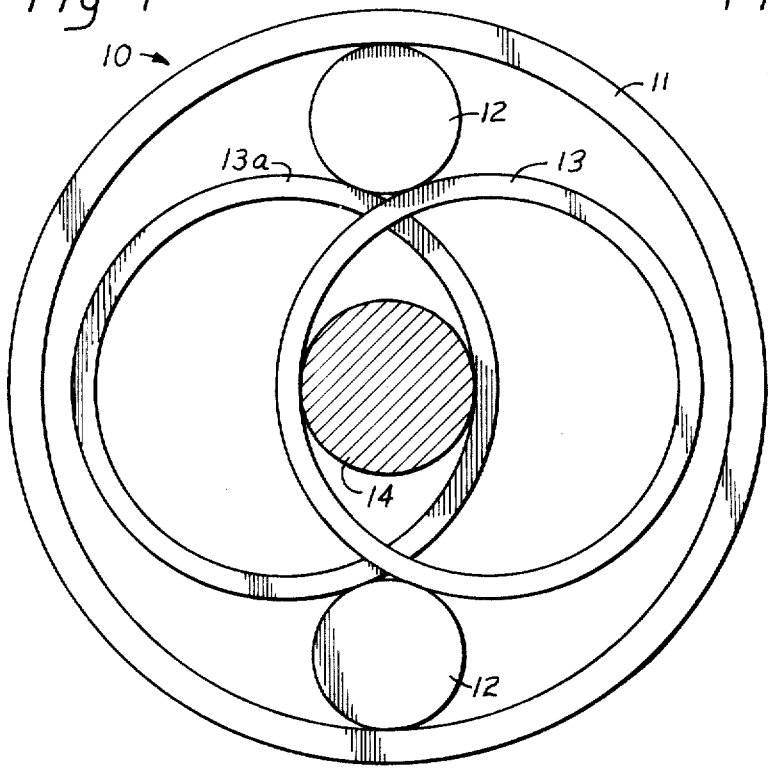
Fig-1
Fig-2
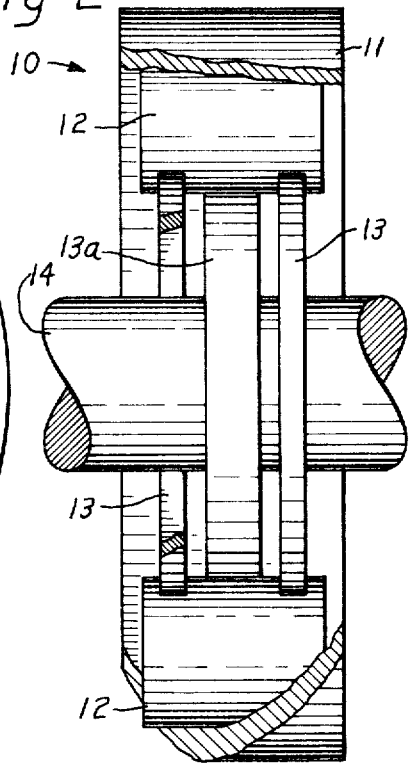
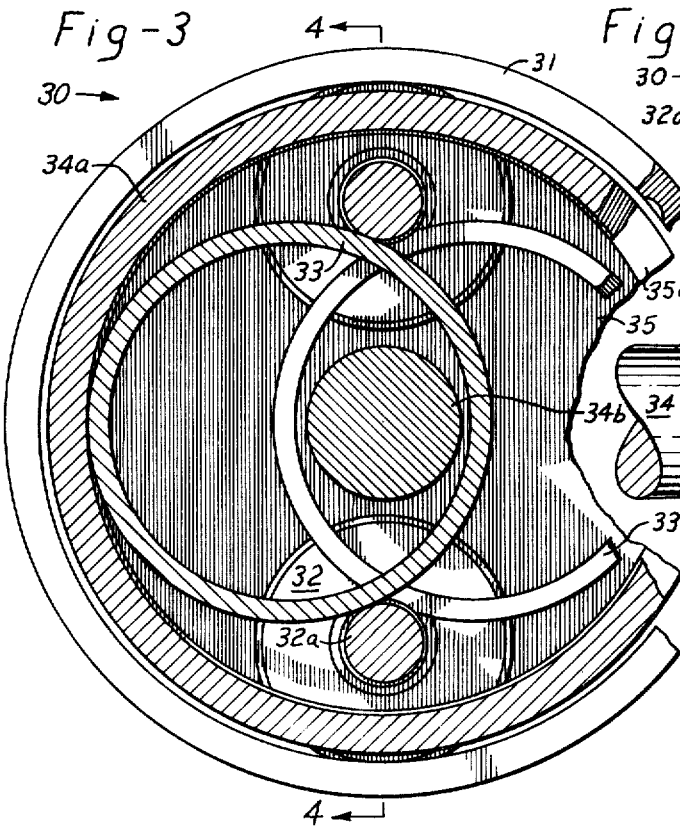
Fig-3
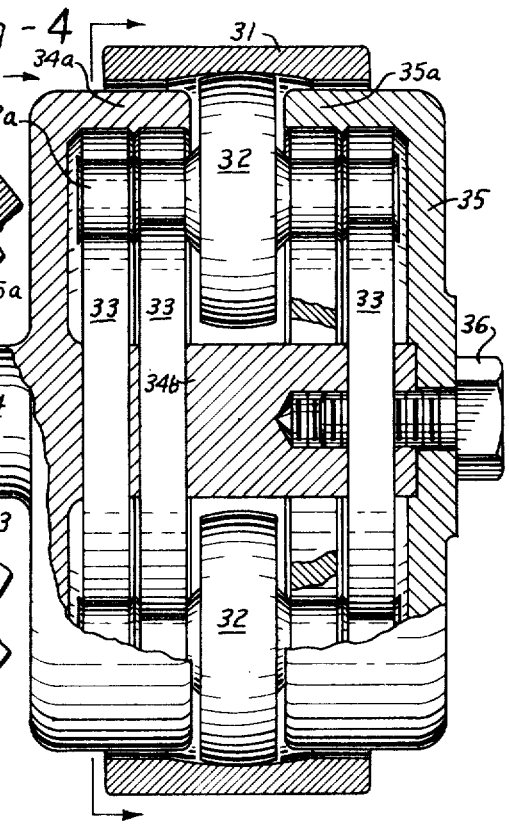
Fig-4

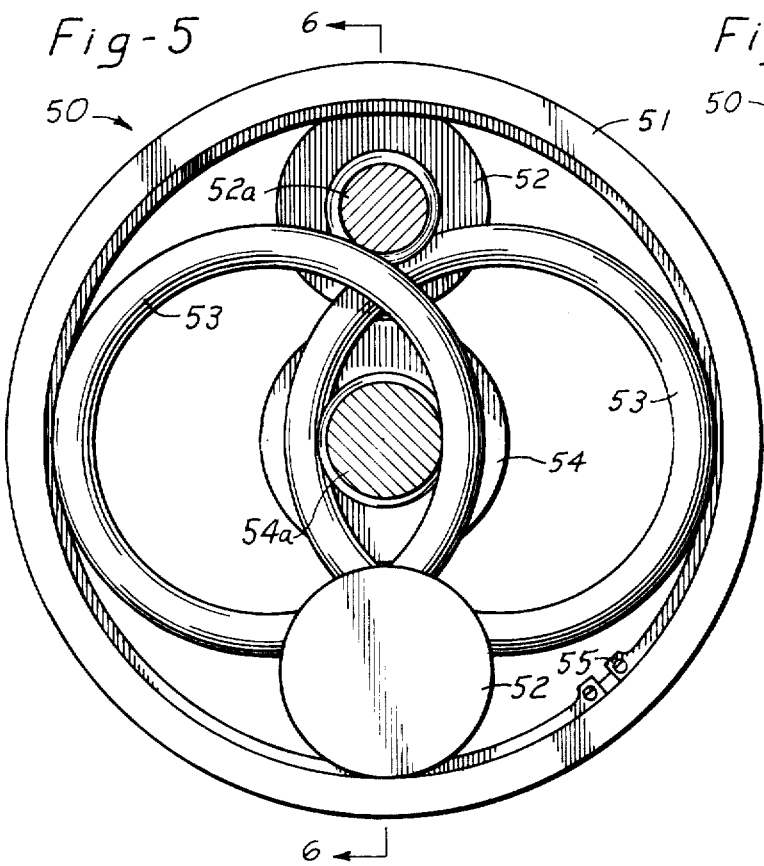
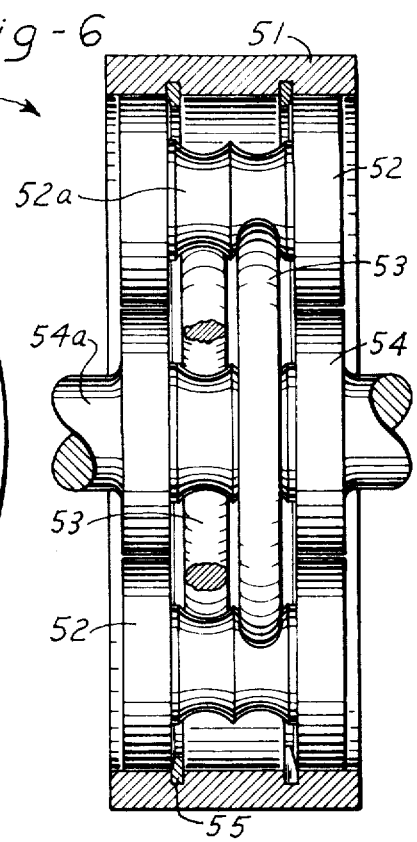
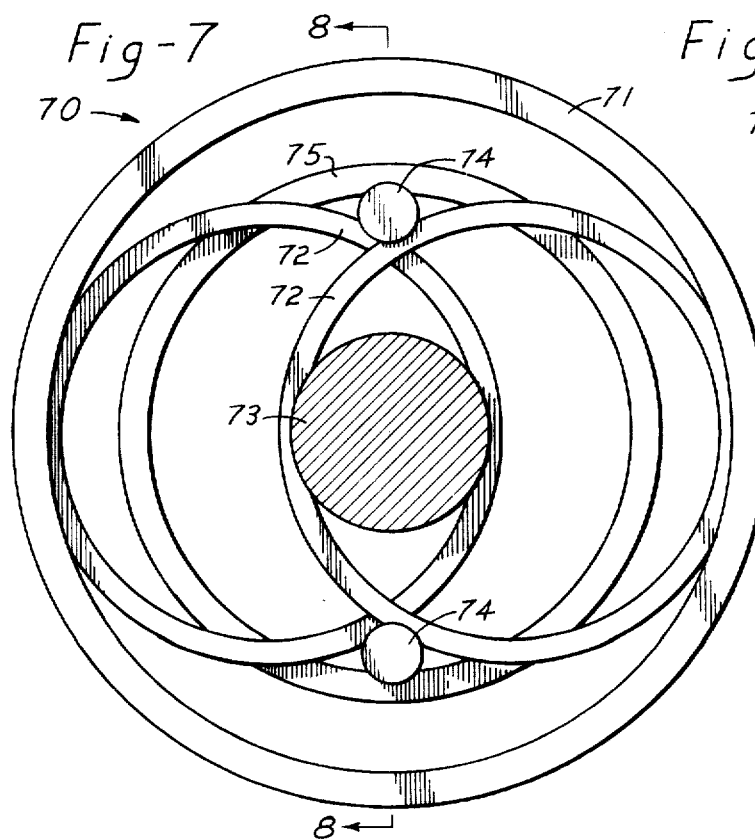
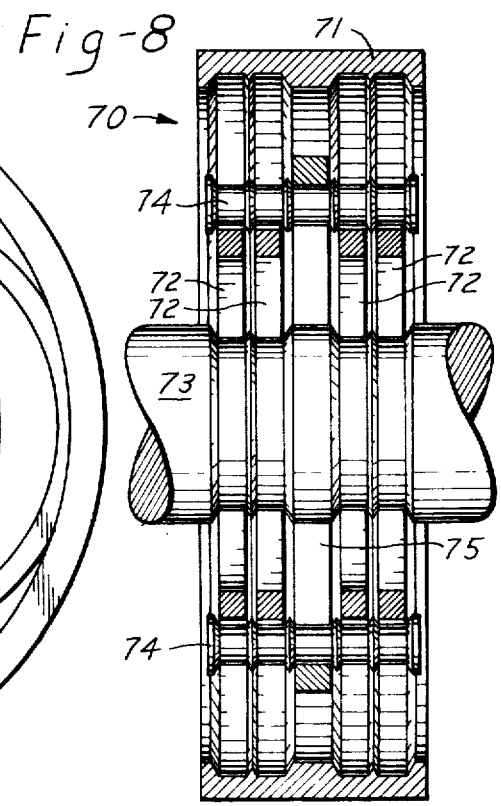

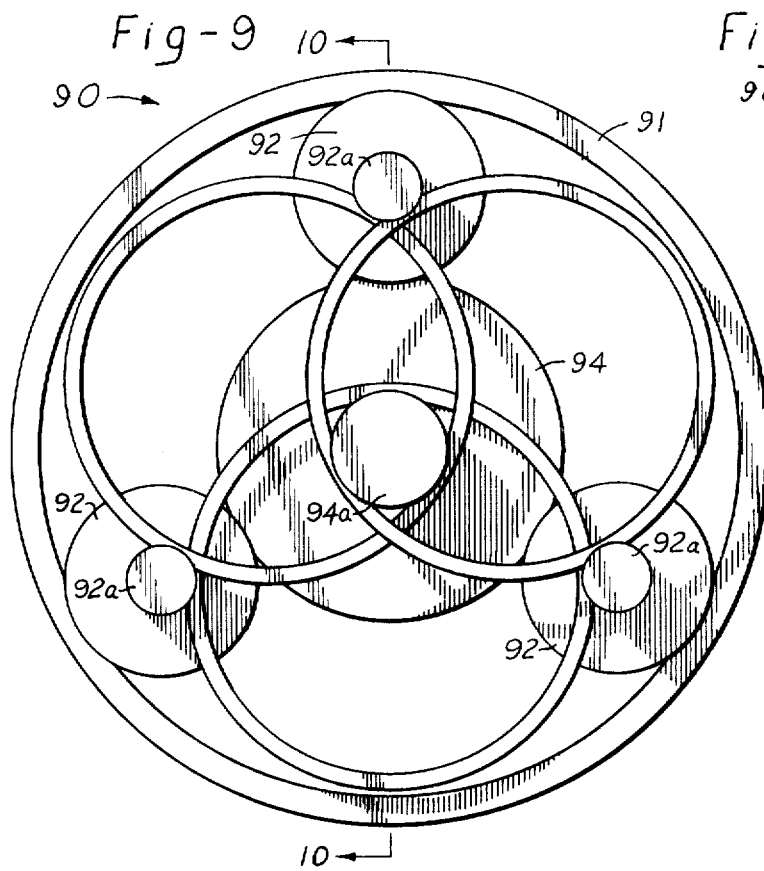
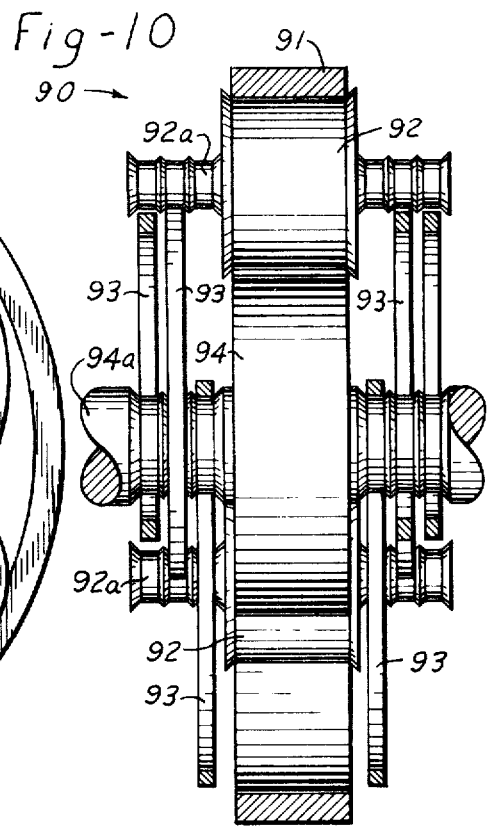
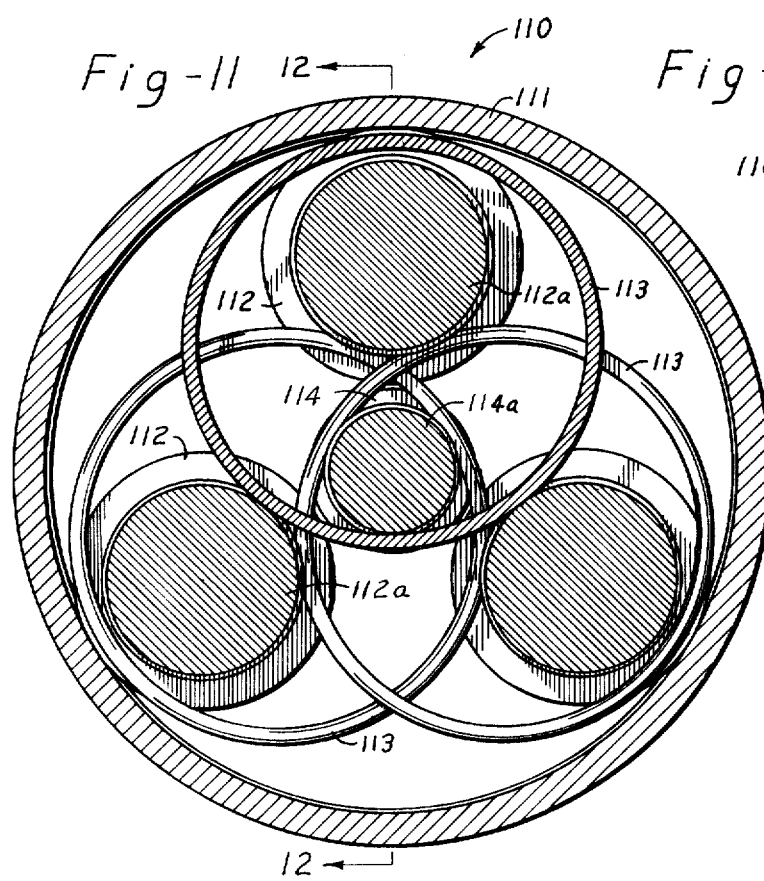
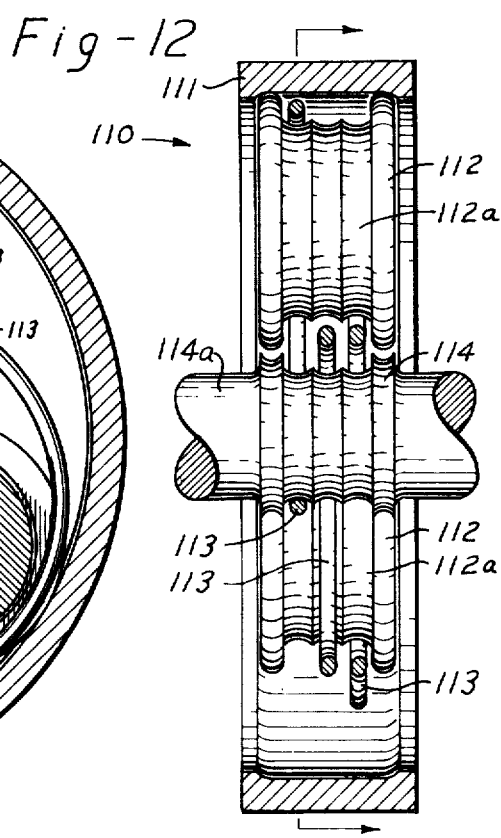

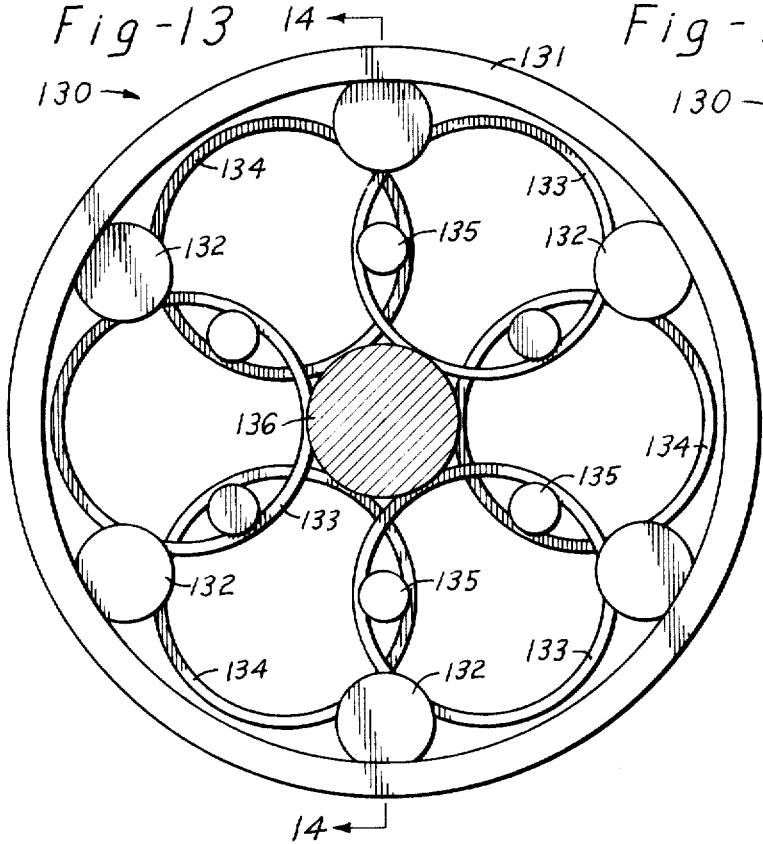
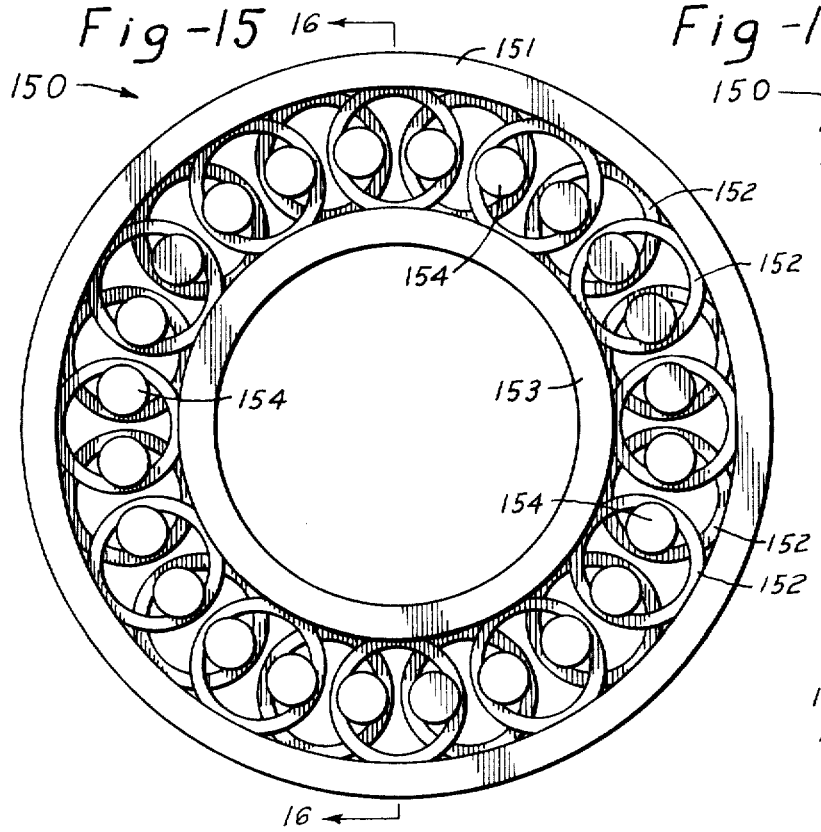

ROLLING CONTACT SPRING BEARINGS

BACKGROUND OF THE INVENTION

Most ball or roller bearings currently in use include sliding friction between their rotating elements and retaining means. Also, all contact under load is between rigid elements, there thus being virtually no inherent spring or shock-absorbing capability.

Although numerous rolling-contact-only bearings have been proposed during about the past century, none have come into common use. Two major reasons for this are: typically all rotating elements are simultaneously under bearing load, resulting in excessive rolling friction, and; dimensional variations between rotating elements cause cumulative-tolerance slippage after repeated rotation, this slippage occuring under full bearing load and thus being appreciable.

Related rolling-contact-only devices are disclosed my U.S. patent applications: Ser. No. 414,150 of Nov. 9, 1973 entitled Rolling Contact Bearing Devices; U.S. Pat. No. 3,937,536 Ser. No. 424,553 of Dec. 13, 1973 entitled Rolling Contact Devices; U.S. Pat. No. 3,969,005 Ser. No. 437,937 of Jan. 30, 1974 entitled Toothed Rolling Contact Devices, U.S. Pat. No. 3,998,506 and; Ser. No. 511,237 of Oct. 2, 1974 entitled Rolling Contact Bearings. U.S. Pat. No. 3,989,324. Various bearing devices are proposed therein which avoid sliding contact between rotating elements, and which usually avoid cumulative-tolerance slippage. However, none of them use spring-rings to provide separation between rotating elements and to simultaneously provide appreciable deflection under bearing load.

SUMMARY OF THE INVENTION

The invention provides radial load bearings which include an outer race and an inner race, between which radial loads are transferred through two or more rollers and two or more spring-rings, thus providing a combination radial load bearing and radial load spring. The inner race may be ring-shaped as in typical ball or roller bearings or may simply be a shaft. The shaft may either extend through all of the spring-rings or through none of them. As few as two sets of spring-rings and rollers may be used, and a much greater number of sets is possible. These sets are equally spaced in a circle around the axis of the bearing, each set comprising one or more axially aligned elements. Some embodiments use retaining rings which are coaxial with the bearing axis.

In the present invention, rollers are considered to be rigid rotating elements, whereas spring-rings are considered to be ring-shaped and capable of being stretched or compressed across their diameters.

In some embodiments of the invention the shaft includes integral rollers which have minimal clearance with the set of outer rollers, so that a small bearing load will bend the spring-rings and permit slight radial displacement of the central shaft, and hence permit the integral rollers to contact the outer rollers and transfer most of the bearing load therebetween, the spring-rings serving primarily to maintain equal separation between the outer rollers. This minimal clearance is provided to preclude cumulative-tolerance slippage between elements, which could occur if the outer race and roller elements were in continuous contact. Because the spring-rings carry very little load, any cumulative-tolerance slippage between them and the elements they contact is small. The clearance between the integral rollers and the outer rollers may be increased, so as to permit the spring-rings to carry increased bearing load, the clearance being limited to that which will preclude exceeding the elastic limit of the spring-rings.

In other embodiments of the invention the spring-rings carry the entire bearing load. An additional set of outer rollers may be provided to carry bearing load and provide separation between the spring-rings, or; positioning rollers may be provided which primarily maintain equal separation between the spring-rings. Retaining rings are provided in some embodiments to hold positioning rollers in place. During every revolution, the rollers and spring-rings have positions of no load or minimum load where accumulated dimensional tolerances may be relieved Accordingly, it is an object of the present invention to provide an improved rolling contact bearing without sliding contact.

Another object of the invention is to provide a rolling contact bearing in which rotating rings act as springs so as to deflect radially under load and at the same time assure equal separation between the other elements.

A further object of the invention is to provide a rolling contact bearing in which the dimensional tolerances of the rotating elements do not cause slippage between them under load.

Other objects of this invention will appear from the following description and appended claims, reference being had to the accompanying drawings forming a part of this specification wherein like characters designate corresponding parts in the several views.

FIG. 1 is a face view of a radial load rolling contact bearing in which loads are transferred from an outer race through two outer rollers and three spring rings to an inner shaft.

FIG. 2 is a side view of FIG. 1 in which part of the outer race and part of one of the spring-rings is broken away to reveal internal structure.

FIG. 3 is a vertical sectional view of a bearing similar to that of FIG. 1 in which loads are transferred from the spring-rings through cup-shaped retainers to a central shaft instead of directly to the shaft, in accordance with another embodiment of the invention.

FIG. 4 is a sectional view of FIG. 3 taken along line 4—4 of FIG. 3 and looking in the direction of the arrows.

FIG. 5 is a face view of a device similar to FIG. 1 with one of the rollers sectioned, except that the central shaft includes integral rollers which contact outer rollers when the bearing is under appreciable load, in accordance with another embodiment of the invention.

FIG. 6 is a sectional view of FIG. 5 taken along line 6—6 of FIG. 5 and looking in the direction of the arrows.

FIG. 7 is a face view of a rolling contact bearing in which the spring-rings contact both outer race and inner shaft, beingheld in place by two spacing rollers which in turn are held in position by a retaining ring, in accordance with another embodiment of the invention.

FIG. 8 is a sectional view of FIG. 7 taken along line 8—8 of FIG. 7 and looking in the direction of the arrows.

FIG. 9 is a face view of a bearing similar to FIG. 3, except that three outer rollers and three sets of spring-rings are used.

FIG. 10 is a sectional view of FIG. 9 taken along line 10—10 of FIG. 9 and looking in the direction of the arrows.

FIG. 11 is a vertical sectional view of a bearing similar to FIG. 9, except that each spring-ring passes radially outwards of the central portion of one of the outer rollers.

FIG. 12 is a sectional view of FIG. 11 taken along line 12—12 of FIG. 11 and looking in the direction of the arrows.

FIG. 13 is a face view of a rolling contact bearing in which there are six spring-rings sets not surrounding the central shaft, six outer rollers and six spacing rollers, in accordance with another embodiment of the invention.

FIG. 14 is a sectional view of FIG. 13 taken along line 14—14 of FIG. 13 and looking in the direction of the arrows.

FIG. 15 is a face view of a bearing similar to FIG. 13, except that the outer rollers have been eliminated and a greater number of sets of Spring-rings and spacing rollers is used, in accordance with another embodiment of the invention.

FIG. 16 is a sectional view of FIG. 15 taken along line 16—16 of FIG. 15 and looking in the direction of the arrows.

Before explaining the present invention in detail, it is to be understood that the invention is not limited to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

DETAILED DESCRIPTION

Turning now to FIGS. 1 and 2, there will be seen device 10 which is a rolling-contact-only bearing in which all radial loads are transferred from outer race 11 through outer rollers 12, through spring-rings 13 and 13a to central shaft 14, which serves as the inner race. Note that there is no sliding contact between any of the elements, all elements being in rolling contact only. When the radial loads are small, shaft 14 will remain at the axis of the bearing. However, increased loads may cause radial displacement of shaft 14 and radial deflection or bending of rings 13 and 13a which support it, thus providing a spring action not found in conventional bearings or other rolling-contact-only bearings.

Note that dimensional variations between the two rollers 12 do not affect the bearing action other than to slightly misalign shaft 14 with respect to the bearing axis. The surface distance either roller 12 travels against race 11 is the same as the distance it travels against each spring ring 13 or 13a. Differences in diameter of the two rollers 12 will not cause one to precess with respect to the other, but rather cause a slight difference in their individual angular velocities. (The concept of using outer rollers with a large difference in their outer diameters, yet without precession, is demonstrated in FIG. 10 of my pending U. S. patent application Ser. No. 414,150 of Nov. 9, 1973 entitled Rolling contact Bearing Devices, U.S. Pat. No. 3,937,536 and FIGS. 10 and 11 of my pending U. S. patent application Ser. No. 437,937 of Jan. 30, 1974 entitled Toothed Rolling Contact Devices U.S. Pat. No. 3,998,506 .) Similarly, the outer diameters of spring-rings 13 and 13a need not be identical. However, the thickness of each spring-ring is important, dimensional differences causing cumulative tolerance slippage between them and shaft 14. Sut such slippage would occur at positions of minimum pressure, and thus be relieved under no-load or small-load conditions. During fabrication, if rings 13 and 13a are fabricated from the same piece of stock, they could be made virtualy identical in thickness.

In order to present the basic concept of the invention as simply as posible, FIGS. 1 and 2 do not depict retention means for preventing axial displacement of the various elements. However, retention means such as those of FIGS. 3 through 16 could be used. Note that elements 12, 13, 13a and 14 may be made in different proportions to accommodate thicker or thinner springs and a larger shaft 14 or ring-shaped inner race.

In FIGS. 3 and 4 can be seen device 30 which is similar to device 10, except that instead of having the inner peripheries of the spring-rings roll against a central shaft, in device 30 their outer peripheries roll against cup-shaped retainers which are fastened to each other through a central shaft and serve as an inner race. In FIGS. 3 and 4 radial loads are transferred from outer race 31 through rollers 32 and their axial ends 32a to four spring-rings 33. From spring-rings 33 the loads are transferred through retainer cups 34a and 35a to shaft 34 and its central extension 34b. The inner peripheries of spring rings 33 do not contact shaft extension 34b. Bolt 36 extends through disc 35 and fastens it to shaft extension 34b. Rollers 32 and the inner periphery of race 31 are spherically shaped to accomodate angular displacement of the shaft 34.

In operating principle, device 30 of FIGS. 3 and 4 is similar to FIGS. 1 and 2 of my pending U.S. patent application Ser. No. 414,150 of Nov. 9, 1973 entitled Rolling Contact Bearing Devices, which utilizes two solid rollers in place of the four spring-rings 33 of FIGS. 3 and 4 of the present invention.

FIGS. 5 and 6 show device 50 which is similar to device 10, except that in device 50 the outer rollers and the shaft each have two different diameters instead of just one. In FIGS. 5 and 6, when the radial load is minimal, the load is transferred from outer race 51 through rollers 52 and their central portion 52a through rings 53 to shaft 54a. When the bearing load is sufficient to deflect shaft 54a from the bearing axis so that the rollers make contact, then loads are transferred from outer race 51 through outer rollers 52 to rollers 54 which are integral with shaft 54a. Snap rings 55 prevent axial displacement of rollers 52. Spring-rings 53 contact neither outer race 51 nor snap rings 55.

Spring-rings 53 will tend to prevent axial displacement of shaft 54, but additionally, beveled edges on rollers 54 similar to those on rollers 92 of FIG. 100 could be used. Also, the cross-section of spring-rings 53 could be rectangular, triangular or otherwise-shaped.

Note that in FIGS. 5 and 6 means is not provided for preventing angular displacement of shaft 54a from the axis of the bearing, it being presumed that two or more devices 50 would be used in conjunction with each other so that angular displacement could not occur.

In FIGS. 5 and 6, rollers 52 and 54 could theoretically be designed to be in continuous contact, that is with zero clearance between them. But this is impractical because it is impossible to manufacture the various elements with zero dimensional tolerances and there would thus be an accumulation of the dimensional differences after a number of rotations which would necessitate sliding contact for relief.

To minimize radial deflection of shaft 54a when radial loads are perpendicular to the plane through the axes of rollers 52, the thickness of rings 53 may be increased. Also, a greater number of rings 53 may be used with axial separation between them, including rings in contact with axial extensions which could be added to rollers 52.

The formula which assures rolling-contact-only between all elements of device 50 when rollers 52 and 54 contact each other is: $(D_1/D_2) = (d_1/d_2) \times (r_1/r_2)$, where $D_1$ = diameter of rollers 52 where they contact outer race 51, $D_2$ = diameter of rollers 52a where they contact rings 53, $d_1$ = major diameter of roller 54, $d_2$ = diameter of shaft 54a where it contacts rings 53, $r_1$ = outer diameter of ring 53, and $r_2$ = inner diameter of ring 53.

FIGS. 7 and 8 depict device 70 which is similar to the preceding devices in that it has two sets of spring-rings. But in device 70 the outer peripheries of spring-rings 72 are in rolling contact with outer race 71 and their inner peripheries roll against shaft 73. Srping-rings 72 are prevented from moving radially inwards by spacing rollers 74, which are held in position by retaining ring 75. Note that when radial loads are small, shaft 73 will tend to remain aligned with the bearing axis and all elements will be in rolling contact only. As radial loads increase, shaft 74 will rotate slightly displaced from the bearing axis, and radial shock loads will cause additional radial displacement. Thus device 70 not only operates as a bearing without sliding friction, but also as a shock-absorbing spring.

Note that rings 72 of device 70 could be considerable broader to minimize axial displacement of shaft 73 with respect to race 71. Also, more than one retaining ring 75 could be used. If retaining rings 75 are used at the ends of rollers 74, they could further be joined to shaft 73 as cup-shaped retainers, in which event the diameter of shaft 73 would be reduced centrally so as not to contact rings 72; thus providing a device similar to device 30.

Device 90 of FIGS. 9 and 10 is similar to device 50 of FIGS. 5 and 6, the primary difference being that in device 50 there are only two sets of spring-rings 180° apart interposed by two outer rollers. In FIGS. 9 and 10 there are three sets of spring-rings 120° apart interposed by three outer rollers. Minimal loads are transferred from outer race 91 to outer rollers 92 and from their axial extensions 92a to spring-rings 93 and from thence to shaft 94a. As previously discussed, the clearance between rollers 92 and 94 may be made very small, so that when radial load exceeds a predetermined minimum it will be transferred from race 91 through rollers 92 directly to roller 94 and shaft 94a, rings 93 then serving primarily to maintain equal separation between the three rollers 92. Rollers 92 have beveled lips on their edges to preclude axial movement between them and outer race 91 and roller 94. Use of the aforementioned formula in dimensioning the various elements will assure rolling contact only.

FIGS. 11 and 12 depict device 110 which is similar to device 90, except that in device 90 each spring-ring 93 is positioned between two axial extensions 92a, whereas in device 110, each spring-ring 113 surrounds a comparable central axial portion 112a. Also, different means is used to prevent axial displacement of the elements. An advantage of device 110 is that its geometry permits a relatively large-diameter central shaft to be used, and the contact spring-rings 113 make with rollers 112a and shaft 114a are fairly close together, thus permitting firmer spring action than in device 90. In FIGS. 11 and 12, when radial loads are light, they are transferred from outer race 111 through rollers 112 and their reduced-diameter central portions 112a to three spring-rings 113 and therefrom to central shaft 114a. When there is sufficient radial load to cause contact between rollers 112 and rollers 114, radial loads will pass directly therebetween, spring-rings 113 then serving primarily to amintain equal separation between rollers 112.

Pairs of spring-rings could also be used on axial extensions of rollers 112 and in device 90. Note that the diameters of rollers 114 could be reduced to allow greater radial deflection of shaft 114a; but the diameter of rollers 114 should remain large enough to assure that springs-rings 113 cannot be distorted beyond their elastic limit.

A variation to device 110 would include desireable features of device 70 of FIGS. 7 and 8. In it, spring rings 113 of FIGS. 11 and 12 would be increased in diameter so that they contact outer race 111, a greater numof rings being used. Rollers 112 would be reduced in diameter so that they no longer contact outer race 111, and axial extensions would be added to them, these being surrounded by retaining rings like ring 75 of device 70. In the resultant device, radial bearing loads would primarily be carried by the spring-rings, rollers 112 and 114 contacting each other only when excessive load is applied to the bearing.

In FIGS. 13 and 14, device 130 depicts a means of using six sets of spring-rings and rollers. More than six sets or as few as four sets of spring-rings and rollers is possible. Radial loads are transferred from outer race 131 through six outer rollers 132, three pairs of narrow spring-rings 133 and three wide spring-rings 134 to shaft 136. Six spacing rollers 135 serve to maintain equal separation between spring-rings 133 and 134, and absorb some of the bearing load. Because the contact points on each spring-ring 133 or 134 are fairly close together, they will not deflect appreciably under load.

Device 150 of FIGS. 15 and 16 is similar to device 130, except that outer rollers 132 are eliminated and a greater number of sets of spring-rings and rollers is used. Elimination of the outer rollers permits device 150 to be much springier than device 130, because in device 150 radial loads are transferred from outer race 151 directly across the diameters of spring-rings 152 to inner race 153, spacing rollers 154 serving primarily to maintain equal separation between spring-rings 152.

If increased stability and control over radial displacement of inner race 153 is desired, one or more retaining rings coaxial with inner race 153 may be added to contact rollers 154 on either their radially outwards or radially inward sides with respect to the bearing axis. Such added retaining rings could further be affixed to inner race 153, provided that contact with rollers 154 is at their radially inward sides and provided that the diameters of all elements are calculated to assure rolling contact only.

I claim:

1. A rolling contact bearing comprising:
   an outer race,
   an inner race,
   rotating roller means,
   said rotating roller means being located between said outer race and said inner race and including a plurality of rollers,
   rotating ring means, said rotating ring means being located between said outer race and said inner race and including a plurality of rings, said rotating ring means being in rolling contact with at least one of said races, so as to transfer at least part of the bearing load therethrough, said rollers and said rings being alternately interposed between and holding each other in position.

2. The rolling contact bearing as claimed in claim 1 in which said inner race is a shaft.

3. The rolling contact bearing as claimed in claim 1 in which said rotating roller means is in rolling contact with said outer race and said rotating ring means is in rolling contact with said inner race.

4. The rolling contact bearing as claimed in claim 3 in which a second roller means is provided, said second roller means including a plurality of rollers which are interposed between and in rolling contact with the inner peripheries of adjacent said rings.

5. The rolling contact bearing as claimed in claim 3 in which at least one roller is integral with said inner race and rolls against said rotating roller means when said inner race is displaced from the axis of said bearing.

6. The rolling contact bearing as claimed in claim 1 in which said rotating ring means is in rolling contact with both said outer race and said inner race.

7. The rolling contact bearing as claimed in claim 6 in which said rotating roller means is held in position by at least one retaining ring.

8. The rolling contact bearing as claimed in claim 1 in which said rotating roller means is in rolling contact with said outer race and said rotating ring means is surrounded by and held in position by two cup-shaped retainers, said retainers being connected to each other by a central shaft.

9. The rolling contact bearing as claimed in claim 1 in which radial loads deform said rings and thereby cause radial displacement of said inner race, so as to provide a combination spring and bearing.

* * * * *